United States Patent [19]

Miyoshi

[11] Patent Number: 5,677,475
[45] Date of Patent: Oct. 14, 1997

[54] ACCELERATION SENSOR IMPACT TEST METHOD AND APPARATUS

[75] Inventor: Motohide Miyoshi, Tokyo, Japan

[73] Assignee: Mitsubishi Denki Kabushiki Kaisha, Tokyo, Japan

[21] Appl. No.: 562,510

[22] Filed: Nov. 24, 1995

[30] Foreign Application Priority Data

Jul. 26, 1995 [JP] Japan .................. 7-190583

[51] Int. Cl.⁶ .................................. G01L 27/00
[52] U.S. Cl. .................................................. 73/1 D
[58] Field of Search .................... 73/1 B, 1 C, 1 D, 73/4 R, 514.32–514.34, 514.38; 29/593, 595

[56] References Cited

U.S. PATENT DOCUMENTS 4,708,012 11/1987 Folk et al. .................. 73/4 R
5,471,876 12/1995 Yano ...................... 73/514.33

FOREIGN PATENT DOCUMENTS 62-13925  8/1994  Japan .................. 73/514.32

*Primary Examiner*—Robert Raevis

[57] ABSTRACT

An impact test apparatus for testing the impact resistance of an acceleration sensor having a cantilevered sensor tip containing a diaphragm comprises a rod-like push needle for depressing a free end of the cantilevered sensor tip, a DC motor for driving the push needle, a controller for controlling the DC motor. The test apparatus is arranged in a process of assembling acceleration sensors wherein the push needle is displaced to depress the free end of the cantilevered sensor tip and a voltage output from the acceleration sensor in response to stresses caused by the depression at the diaphragm is detected by a voltmeter.

6 Claims, 4 Drawing Sheets

ACCELERATION SENSOR IMPACT TEST METHOD AND APPARATUS

BACKGROUND OF THE INVENTION

1. Field of the Invention

The present invention relates to a test method and apparatus for testing the impact resistance of acceleration sensors, and, particularly, semiconductor-type acceleration sensors.

2. Description of the Prior Art

Semiconductor-type acceleration sensors are today widely used for impact detection as part of various automotive subsystems, including antilock brake control systems, suspension control systems, and most recently airbag systems.

FIG. 4 is a cross section of the internal structure of a semiconductor acceleration sensor. As shown in FIG. 4, the semiconductor acceleration sensor 1 is a hermetically sealed package comprising a cap 2 and metal stem 3, and is connected via conductive leads 4. The cap 2 is a box-shaped container of which, typically, the side with the greatest area is open. The open edges of this cap 2 are then welded to the plate-like metal stem 3 to cover and seal the box-shaped container. Note that the edges of the open side of the cap 2 are flanged for easier welding to the metal stem 3.

Glass tubes are then fit over the conductive leads 4 to the part of the leads inserted to the metal stem 3, and the glass tube-sheathed conductive leads 4 are then inserted to the metal stem 3. The assembly is then heated to melt the glass tubes, thereby forming glass seals 5 and sealing the conductive leads 4 within respective lead insertion holes of the metal stem 3. It is therefore possible to seal the inside of the cap 2 by welding the metal stem 3 to the cap 2.

A thick-film resistor substrate 6 comprising circuitry containing resistances printed on a ceramic substrate is bonded to the metal stem 3 by resin. The sensor tip 7 of the semiconductor acceleration sensor 1 is then bonded to the thick-film resistor substrate 6 by means of a pedestal 8, thus forming a cantilevered structure. The electrode on the sensor tip 7 is bonded to a specific land of the thick-film resistor substrate 6 by means of a bonding wire 9, and the various conductive leads 4 are similarly bonded to the respective lands of the thick-film resistor substrate 6 by means of bonding wires 10.

The sensor tip 7 comprises a diffused p-silicon layer on the surface of an n-silicon chip, forming diffused resistors in a Whetstone bridge structure for utilizing the piezoresistance effect. The back of the chip is then etched to concentrate stresses at the diffused resistors, forming a thin-wall portion 11 called a "diaphragm." The semiconductor acceleration sensor 1 thus comprises a cantilevered sensor tip 7 with a diaphragm 11 for improving the detection sensitivity. This structure also makes the sensor tip 7 susceptible to breakage as a result of stress, caused by dropping or impact, occurring upon handling the semiconductor acceleration sensor 1. An impact tester has therefore been conventionally used during the production of the semiconductor acceleration sensors to measure the drop and impact resistance of all sensor tips 7, and thereby ensure a reasonable impact resistance.

FIG. 5 is a simplified illustration of the conventional impact tester 20. The impact tester 20 comprises a fixed base 21 and a movable head 22. The semiconductor acceleration sensor 1 being tested is placed in the mounting jig 23 and 24, and the mounting jig 23 and 24 is then secured to the top of the movable head 22. The movable head 22 is then raised to a predetermined height by means of air pressure, and a brake (not shown in the figure) is applied. From this position, a known force is applied by air pressure in the direction in which the movable head 22 falls. Once this known air pressure force is applied to the movable head 22, the brake is released, allowing the movable head 22 to drop and causing the impact of the collision between the movable head 22 and the fixed base 21 to transfer to the semiconductor acceleration sensor 1.

A cushion 25 is also provided where the movable head 22 strikes the fixed base 21 to adjust the impact of the movable head 22. The impact acting on the semiconductor acceleration sensor 1 can thus be adjusted by means of the cushion 25 and by controlling the air pressure applied to the movable head 22 when the brake is applied.

There are numerous problems with the impact tester 20 shown in FIG. 5 in a mass production environment. First, while it is possible to test approximately ten semiconductor acceleration sensors it one time, productivity is extremely low because each impact test requires approximately three minutes. The impact tester 20 is also relatively expensive and suffers from low durability because a force of approximately 3000 G is applied when dropping the movable head 22, causing the impact tester 20 itself to frequently break down and thus necessitating frequent replacement of consumable parts.

SUMMARY OF THE INVENTION

Therefore, an object of the present invention is to provide a high durability, low cost impact test method and apparatus enabling good productivity in a process for impact-testing semiconductor acceleration sensors.

To achieve the aforementioned object, an impact test method according to the present invention for testing the impact resistance of an acceleration sensor having a cantilevered sensor tip containing a diaphragm member is characterized by providing a test station in the acceleration sensor assembly process, and at said test station testing the impact resistance by setting the rod-like push needle in direct contact with the free end of the cantilevered sensor tip and depressing said free end by means of said push needle. It is therefore possible during the manufacturing process to apply to the sensor tip stress equivalent to the impact applied by the conventional impact test method using a conventional impact tester, and defects in the acceleration sensor can thus be detected before the assembly process is completed and before the acceleration sensor becomes part of a finished product.

An acceleration sensor impact test method according to the present invention is preferably characterized by supplying current to the acceleration sensor to which the impact test is being applied in the test station in the acceleration sensor assembly process; detecting the voltage output from the tested acceleration sensor in response to the stress received by the sensor tip; and depressing the rod-like push needle against the free end of the sensor tip until the detected output voltage reaches a predetermined value. It is therefore possible during the manufacturing process to apply to the sensor tip stress equivalent to the impact applied by the conventional impact test method using a conventional impact tester. Defects in the acceleration sensor can thus be detected efficiently and early in the production process, and productivity can be improved.

An acceleration sensor impact test method according to the present invention is also preferably characterized by detecting from the output voltage of the acceleration sensor the instant the push needle contacts the sensor tip, and moving said push needle a predetermined distance in the direction depressing the sensor tip from the instant of contact. By thus simply moving the push needle a predetermined distance from the instant contact with the sensor tip is detected, stress equivalent to the impact applied by the conventional impact test method using a conventional impact tester can be accurately applied to the sensor tip.

An impact test apparatus according to the present invention for testing the impact resistance of an acceleration sensor having a cantilevered sensor tip structure containing a diaphragm member comprises a rod-like push needle for depressing the free end of the cantilevered sensor tip; a push needle drive means for moving the push needle; and a control means for controlling the operation of the push needle drive means. Said impact test apparatus is characterized by being disposed in the test station in the acceleration sensor assembly process with said control means controlling the push needle drive means to drive the push needle in a manner applying a predetermined pressure to the free end of the sensor tip. It is therefore possible during the manufacturing process to apply to the sensor tip stress equivalent to the impact applied by the conventional impact test method using a conventional impact tester, and thereby test the impact resistance of the acceleration sensor using a test apparatus of simple construction. The test apparatus of the present invention is therefore lower in cost, and can test the impact resistance more efficiently than is possible using the impact test apparatus according to the prior art.

An impact test apparatus according to the present invention further preferably comprises a power supply means for supplying current to the acceleration sensor to which the impact test is being applied; and a voltage detection means for detecting the output voltage from the tested acceleration sensor; and is characterized by said control means monitoring the output voltage detected by the voltage detection means, and controlling the push needle drive means to move the push needle to the position whereby the monitored voltage value becomes a specified voltage value. It is thereby possible to accurately apply to the sensor tip stress equivalent to the impact applied by the conventional impact test method using a conventional impact tester.

An impact test apparatus according to the present invention further preferably comprises a power supply means for supplying current to the acceleration sensor to which the impact test is being applied; and a voltage detection means for detecting the output voltage from the tested acceleration sensor; and is characterized by said control means monitoring the output voltage detected by the voltage detection means, detecting from the monitored voltage value the instant the push needle contacts the sensor tip, and controlling the push needle drive means to move the push needle a predetermined distance from the instant of contact in the direction depressing the sensor tip to apply a predetermined pressure to the sensor tip. It is thereby possible by moving the push needle a predetermined distance to accurately apply to the sensor tip stress equivalent to the impact applied by the conventional impact test method using a conventional impact tester.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF PREFERRED EMBODIMENTS

The preferred embodiments of the present invention are described in detail below with reference to the accompanying figures.

[Embodiment 1]

Figure 1:
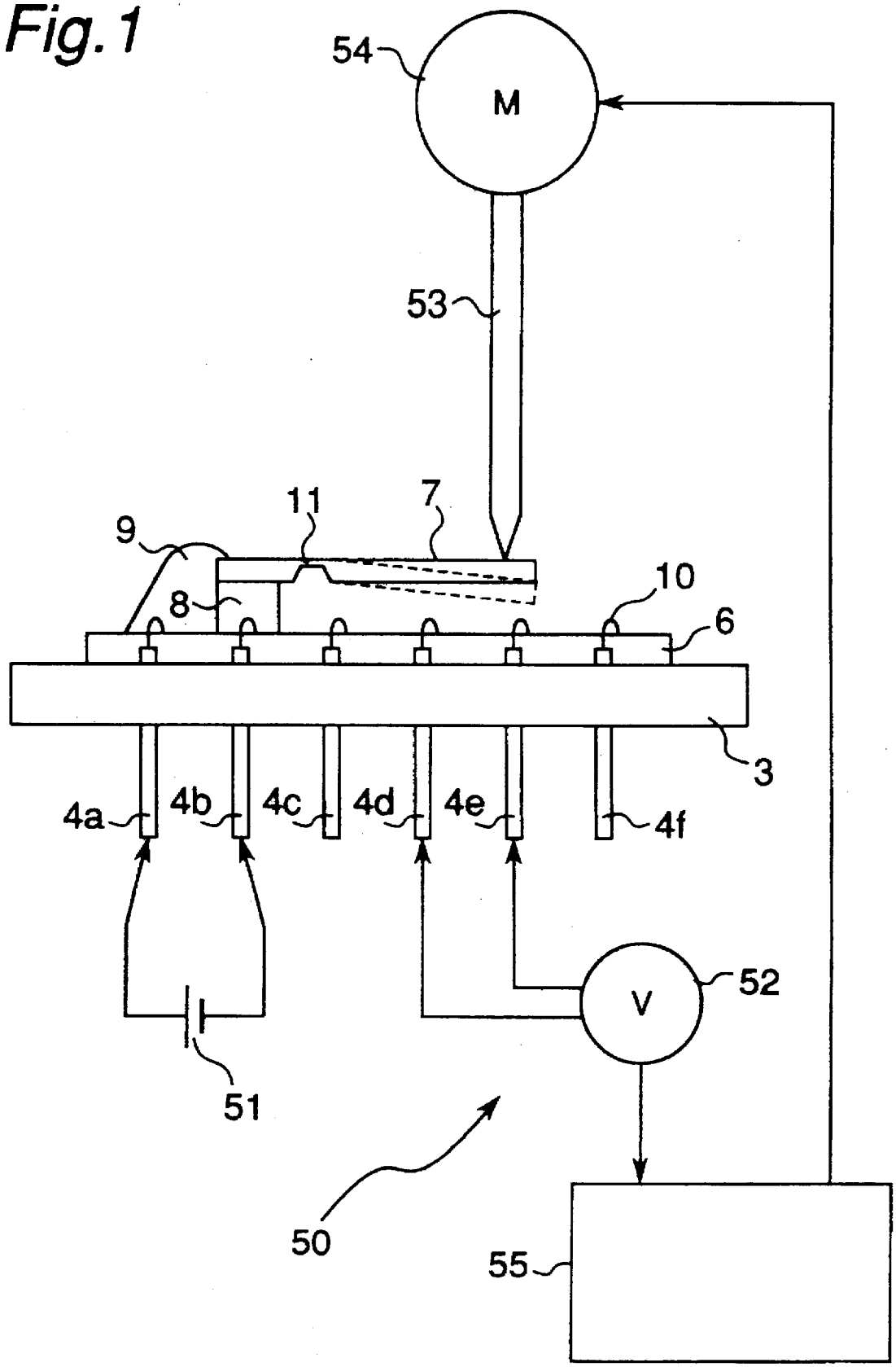
FIG. 1 is a simplified illustration of an impact test apparatus according to the preferred embodiment of the present invention.
Figure 4:
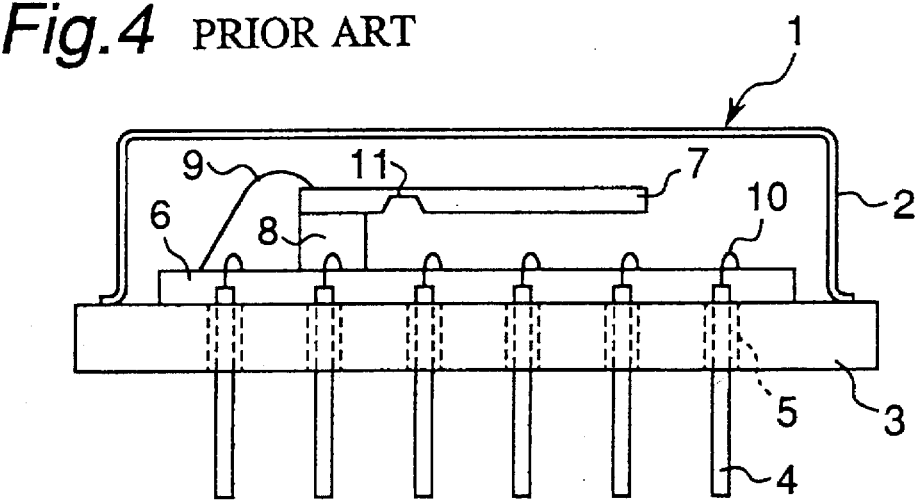
FIG. 4 is a cross section diagram of the internal structure of a semiconductor acceleration sensor.
Figure 5:
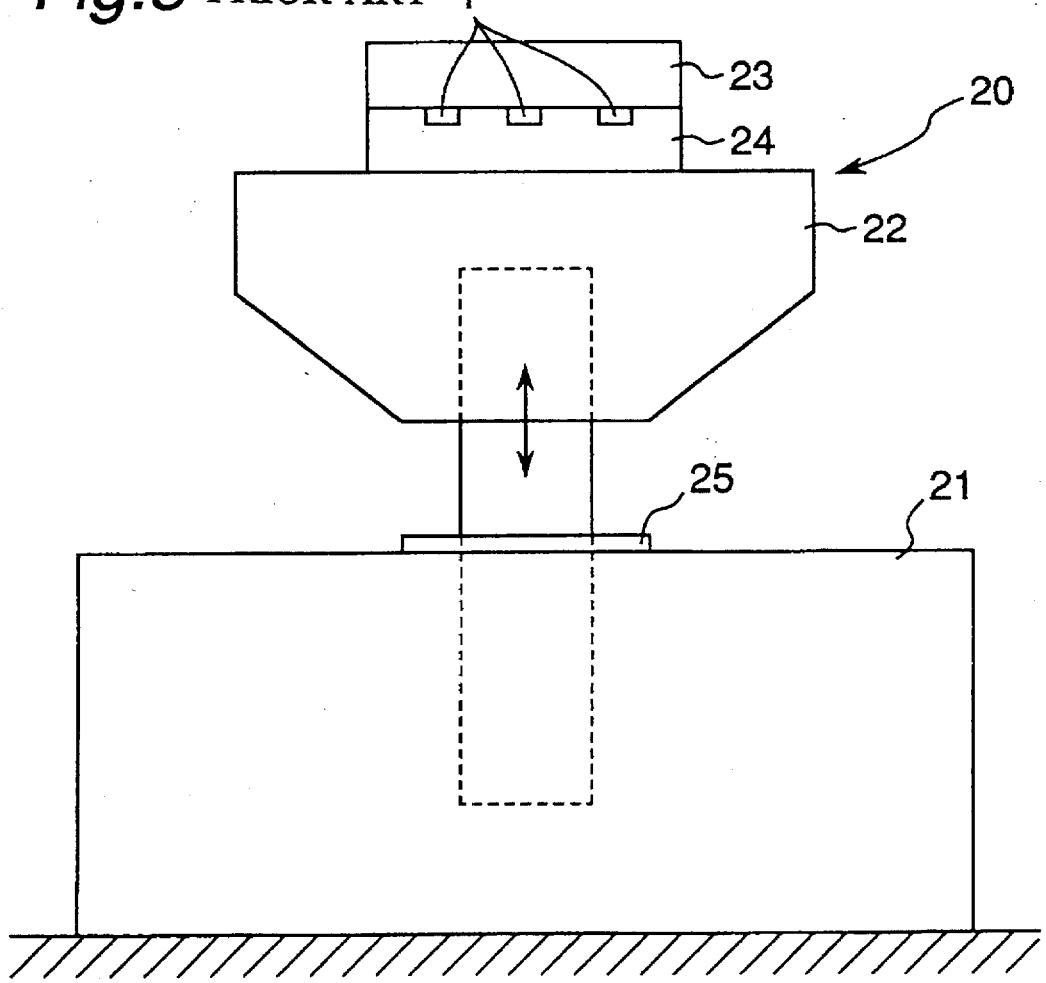
FIG. 5 is a simplified illustration of a conventional impact test apparatus.

FIG. 1 is a simplified illustration of the first embodiment of an impact test apparatus according to the present invention. Note that like parts in FIGS. 1 and 4 are identified by like reference numerals, and further description thereof is omitted below.

As shown in FIG. 1, the impact test apparatus 50 of the present invention comprises a drive power supply 51 for electrically operating the acceleration sensor 1A to which the impact test is being applied (the "tested acceleration sensor 1A" below); a voltmeter 52 for monitoring the voltage output from the tested acceleration sensor 1A; a rod-like push needle 53 having a lower end formed with an insulation material, and used for depressing the free end of the sensor tip 7 of the tested acceleration sensor 1A; a stepping motor 54 for moving the push needle 53 vertically; and a controller 55 for controlling stepping motor drive based on the information supplied from the voltmeter 52. It is to be noted that the drive power supply 51 is an example of a device which achieves the power supply means, the voltmeter 52 is an example of a device which constitutes the voltage detection means, the stepping motor 54 is an example of a device which constitutes the push needle drive means, and the controller 55 is an example of a device which achieves the control means of the present invention.

The drive power supply 51 is a DC power supply whereof the positive (+) terminal is connected to lead 4a, which is the (+) power supply terminal of the tested acceleration sensor 1A, and the negative (−) terminal is connected to lead 4b, which is the (−) power supply terminal of the tested acceleration sensor 1A. The voltmeter 52 is connected to leads 4d and 4e, the output terminals, of the tested acceleration sensor 1A, and to the controller 55. The controller 55 is also connected to the stepping motor 54.

It is to be further noted that the impact test apparatus 50 of the present invention tests the impact resistance of the semiconductor acceleration sensor 1 before the cap 2 is welded to the stem 3, and the tested acceleration sensor 1A is set at a predetermined position with respect to the impact test apparatus 50 such that the impact test can be conducted by pressing the free end of the sensor tip 7 vertically.

Figure 2:
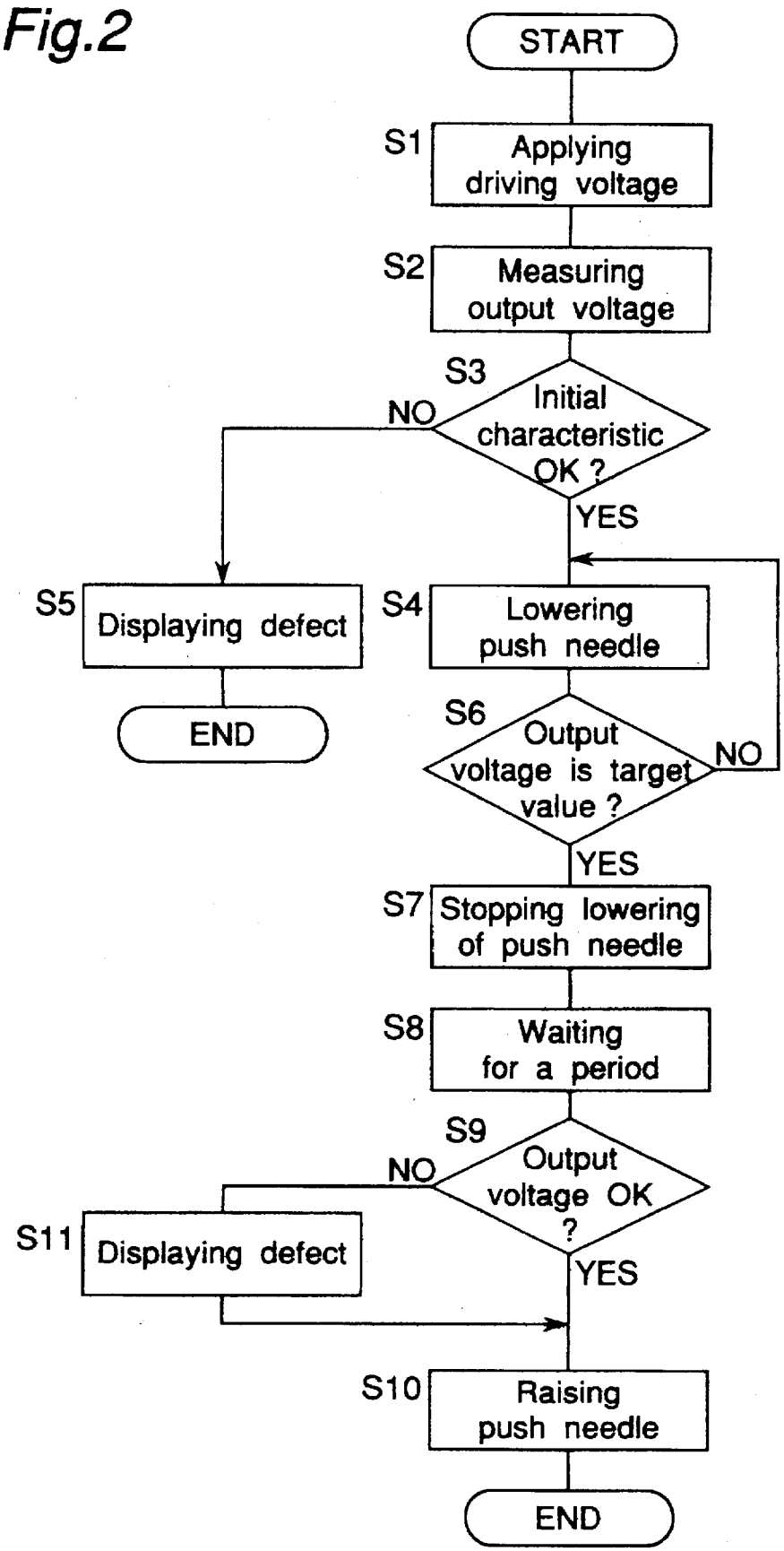
FIG. 2 is a flow chart of the operation of the impact test apparatus shown in FIG. 1 according to a first embodiment of the test method of the present invention.

FIG. 2 is a flow chart describing the operation of the impact test apparatus 50 shown in FIG. 1. Said operation is described below.

At the first step S1 in FIG. 2, a drive voltage is applied to the power supply terminal of the tested acceleration sensor 1A positioned as specified to the impact test apparatus 50. The output voltage from the tested acceleration sensor 1A is then measured by the voltmeter 52 (step S2). The controller 55 then obtains the measured voltage data from the voltmeter 52, confirms the initial characteristic of the tested acceleration sensor 1A from this voltage data, and advances control (returns YES) from step S3 to step S4 if there is no problem detected from the initial characteristic.

At step S4, the controller 55 instructs the stepping motor 54 to lower the push needle 53. When the stepping motor 54 receives this instruction, the push needle 53 is lowered at a predetermined speed to depress the free end of the sensor tip 7 of the tested acceleration sensor 1A. Control then passes to step S6.

If the controller 55 detects a problem from the initial characteristic of the tested acceleration sensor 1A and therefore returns NO in step S3, control passes to step S5. The controller 55 then displays a notice for the operator indicating that a defect was detected in the tested acceleration sensor 1A, and the test procedure terminates.

At step S6, the controller 55 monitors the output voltage from the tested acceleration sensor 1A measured by the voltmeter 52, and compares the detected output voltage with a predetermined target value. If the detected voltage does not equal the target value (step S6 returns NO), control loops back to step S4 and the push needle is driven further down. If the detected voltage equals the target value (step S6 returns YES), control advances to step S7. A command is then issued by the controller 55 instructing the stepping motor 54 to stop lowering the push needle 53; the stepping motor 54 therefore stops driving the push needle 53, and control advances to step S8.

At step S8, the controller 55 pauses for a predetermined period with the push needle 53 held steady by the stepping motor 54. After this period, the controller 55 detects any defect in the tested acceleration sensor 1A based on the output voltage information of the tested acceleration sensor 1A monitored by the voltmeter 52. Such defects can be determined by detecting, for example, the non-output of a voltage from the tested acceleration sensor 1A, which will occur when the tested acceleration sensor 1A breaks. If a defect is not detected (step S9 returns YES), control advances to step S10.

At step S10, the controller 55 instructs the stepping motor 54 to raise the push needle 53. When the push needle 53 is thus raised by the stepping motor 54, the pressure applied to the sensor tip 7 of the tested acceleration sensor 1A is released, and the test sequence ends.

If a defect is detected in the tested acceleration sensor 1A and step S9 returns NO, control shifts to step S11, the controller 55 then displays a notice for the operator indicating that a defect was detected in the tested acceleration sensor 1A, and control passes to step S10.

With the impact test apparatus 50 according to the first embodiment of the present invention, the tested acceleration sensor 1A converts the change in stress corresponding to the acceleration detected by the diaphragm 11 of the sensor tip 7 to a voltage, and outputs this voltage. If the magnitude of the required impact acceleration is known, it is also possible to determine the magnitude of the corresponding output voltage from the tested acceleration sensor 1A. Therefore, by constantly monitoring the output voltage of the tested acceleration sensor 1A while gradually depressing the free end of the sensor tip 7 by means of the push needle 53 until the detected output voltage reaches the voltage corresponding to the required impact acceleration., the test stress can be focused on the diaphragm 11 of the sensor tip 7, and stress equivalent to that applied by a conventional impact tester 20 can be applied to the tested acceleration 25 sensor 1A. It is therefore possible to accomplish the impact test on the assembly line, and to thereby dramatically improve the productivity of acceleration sensor manufacturing.

[Embodiment 2]

In the impact test apparatus of the first embodiment, drive power is supplied to the tested acceleration sensor 1A, the output voltage from the tested acceleration sensor 1A is constantly monitored using the voltmeter 52, and the stepping motor 54 is thus feedback-controlled to drive the push needle 53 and mechanically depress the free end of the sensor tip 7 of the tested acceleration sensor 1A according to the monitored voltage. It is also possible, however, to mechanically depress the free end of the sensor tip 7 by a predetermined distance only using the push needle 53. The operation of an impact test apparatus accomplishing this test method is described below with reference to the flow chart in FIG. 3 as the second embodiment of the present invention.

Figure 3:
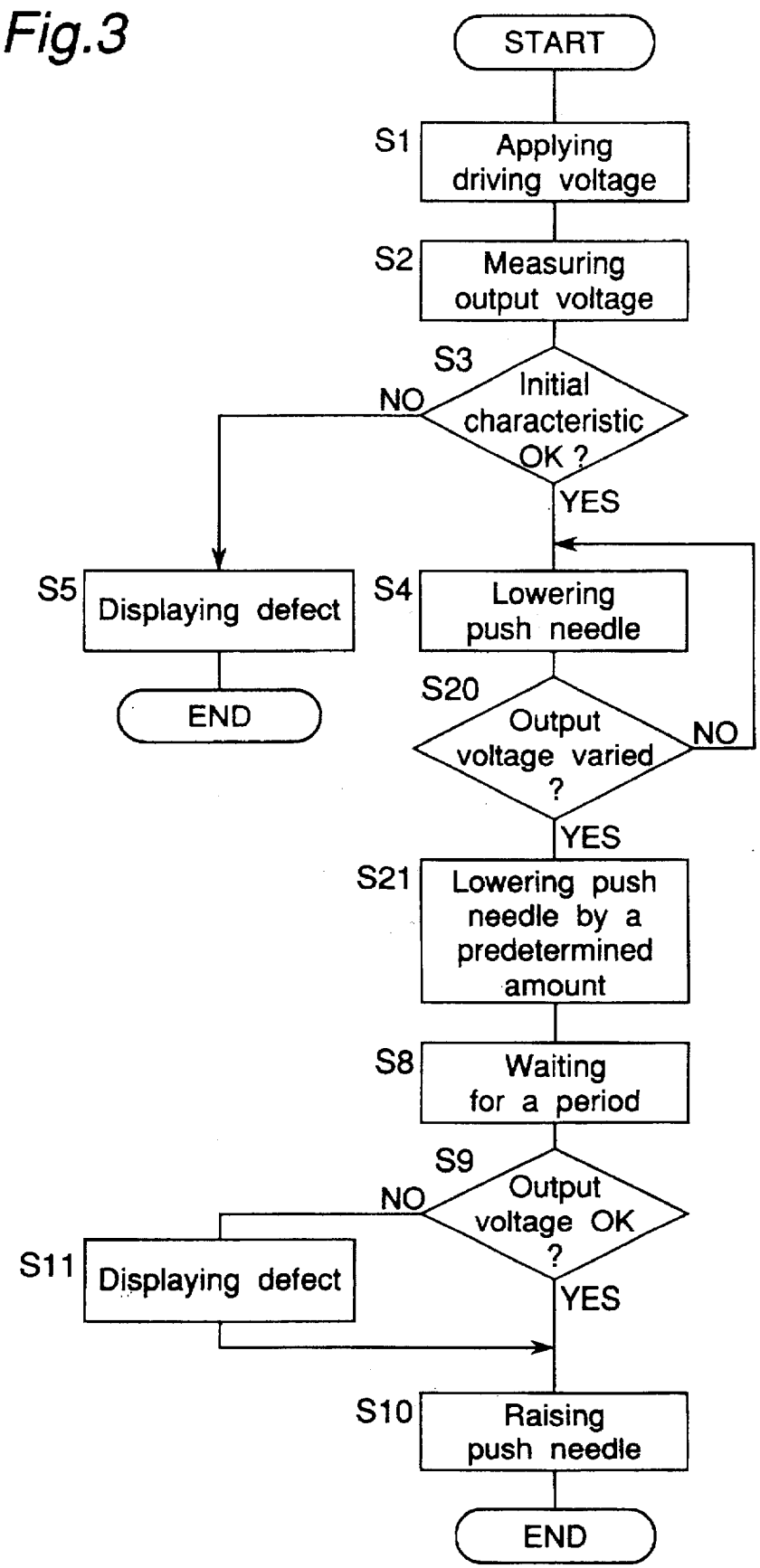
FIG. 3 is a flow chart of the operation of the impact test apparatus shown in FIG. 1 according to a second embodiment of the test method of the present invention.

FIG. 3 is a flow chart describing the operation of the impact test apparatus 50 shown in FIG. 1 as the second embodiment of the present invention. Said operation is described below. Note that identical steps in the flow charts in FIGS. 2 and 3 are identified with the same step numbers, and further description thereof is omitted below; only the differences between these flow charts are described.

The flow chart in FIG. 3 differs from that in FIG. 2 in that the process accomplishing the evaluation of step S6 Of FIG. 2 is replaced by step S20, and the process of step S7 is replaced by step S21.

After step S4 in FIG. 3, the controller 55 detects any change in the output voltage from the tested acceleration sensor 1A monitored by the voltmeter 52 as a means of detecting the instant the push needle 53 contacts the sensor tip 7. When a voltage change is detected, step S20 outputs YES, and control advances to step S21; when no change is detected, step S20 outputs NO, and control loops back to step S4. At step S21 the controller 55 instructs the stepping motor 54 to lower the push needle 53 by a predetermined distance, and control then passes to step S8.

The tested acceleration sensor 1A thus converts the change in stress corresponding to the acceleration detected by the diaphragm 11 of the sensor tip 7 to a voltage, and outputs this voltage. If the magnitude of the required impact acceleration is known, it is also possible to determine the magnitude of the corresponding output voltage from the tested acceleration sensor 1A. However, if the output voltage of the tested acceleration sensor 1A is saturated when the required maximum acceleration is applied, the impact test apparatus of the first embodiment above is unable to correctly execute the impact test.

Therefore, the impact test apparatus 50 of the second embodiment continuously monitors the output voltage from the tested acceleration sensor 1A to detect any change in the output voltage and thereby detect the instant the push needle 53 contacts the sensor tip 7. By then driving the push needle 53 at a known speed for a known distance from that instant of contact to depress the free end of the sensor tip 7, stress can be focused on the diaphragm 11 of the sensor tip 7 and stress equivalent to that applied by the conventional impact tester 20 can be applied to the tested acceleration sensor 1A even with a semiconductor acceleration sensor in which the output voltage is saturated when the required maximum acceleration is applied. It is therefore possible to accomplish the impact test on the assembly line, and to thereby dramatically improve the productivity of acceleration sensor manufacturing.

Note that while the tested acceleration sensor 1A is positioned such that the sensor tip 7 operates up and down in the impact test apparatus of the first and second embodiments of the present invention described above, the tested acceleration sensor 1A may be alternatively positioned such that the sensor tip 7 operates horizontally, in which case it is sufficient to reorient the stepping motor 54 and push needle 53 so that the push needle 53 operates in the same direction as a displacement of the sensor tip 7.

It will be obvious to those skilled in the art that various other configurations of the impact test apparatus described above are thus similarly possible, and such other configurations shall also be within the scope of the present invention.

As described hereinabove, the acceleration sensor impact test method of the present invention can apply to the acceleration sensor stress equivalent to that achieved by the conventional impact test method by continuously monitoring the output voltage of the acceleration sensor and depressing the free end of the sensor tip until the output voltage reaches the voltage corresponding to the required impact acceleration during the acceleration sensor assembly process. The impact test can therefore be accomplished during the assembly process, and the productivity of acceleration sensor manufacturing can be greatly improved.

Furthermore, by detecting the instant of contact between the push needle and the sensor tip by continuously monitoring the output voltage of the acceleration sensor and detecting any change in said output voltage, and then driving the push needle to depress the free end of the sensor tip a predetermined distance from that point, stress equivalent to that applied by the conventional impact test method can be applied to the tested acceleration sensor even with acceleration sensors in which the output voltage is saturated when the required maximum acceleration is applied. It is therefore possible to accomplish the impact test on the assembly line, and to thereby dramatically improve the productivity of acceleration sensor manufacturing, even with acceleration sensors in which the output voltage is saturated when the required maximum acceleration is applied.

Furthermore, by continuously monitoring the output voltage of the tested acceleration sensor to detect the instant the push needle contacts the sensor tip by detecting the change in the output voltage, and then driving the push needle at a known speed for a known distance from that instant of contact to depress the free end of the sensor tip, stress equivalent to that applied by the conventional impact test method can be applied to the tested acceleration sensor even with an acceleration sensor in which the output voltage is saturated when the required maximum acceleration is applied. An impact test apparatus of relatively simple construction and excellent durability can therefore be achieved, and the costs associated with the impact test apparatus can be reduced, even with acceleration sensors in which the output voltage is saturated when the required maximum acceleration is applied. It is also possible to accomplish the impact test on the assembly line, and to thereby dramatically improve the productivity of acceleration sensor manufacturing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An impact test method for testing the impact resistance of an acceleration sensor having a cantilevered sensor tip containing a diaphragm, comprising the steps of:

providing a test station in a process of assembling acceleration sensors, and, at the test station, bringing a rod-like push needle into direct contact with a free end of the cantilevered sensor tip, supplying a current to the acceleration sensor to be tested, displacing the rod-like push needle to deform the cantilevered sensor tip, detecting a voltage output from the acceleration sensor in response to stresses generated at the diaphragm of the cantilevered sensor tip while displacing the rod-like push needle against the free end of said sensor tip, and continuing said displacing step and said detecting step until the detected output voltage reaches a predetermined value.

2. The acceleration sensor impact test method according to claim 1 wherein:

said sensor tip of said tested acceleration sensor is set so as to deform in a vertical direction, and said push needle is operated to move in the vertical direction.

3. The acceleration sensor impact test method according to claim 1, wherein said displacing step displaces the rod-like push needle in a vertical direction to deform the cantilevered sensor tip.

4. The acceleration sensor impact test method according to claim 1, further comprising the steps of:

raising the rod-like push needle after said continuing step has finished.

5. An impact test apparatus for testing the impact resistance of an acceleration sensor having a cantilevered sensor tip structure containing a diaphragm, comprising:

power supply means for supplying a current to said acceleration sensor to be tested;

a rod-like push needle for depressing a free end of said cantilevered sensor tip;

push needle drive means for moving said rod-like push needle to test said acceleration sensor;

voltage detection means for detecting an output voltage from said tested acceleration sensor;

control means for controlling the operation of said push needle drive means said control means monitoring the output voltage detected by said voltage detection means and controlling said push needle drive means to move said push needle until the monitored voltage value becomes a specified voltage value.

6. The acceleration sensor impact test apparatus according to any one of claim 5 wherein:

said tested acceleration sensor is disposed in a manner whereby the free end of said sensor tip deforms in a vertical direction, and said push needle is driven to move in the vertical direction.

* * * * *